United States Patent
Rao et al.

(10) Patent No.: US 11,784,945 B2
(45) Date of Patent: Oct. 10, 2023

(54) DYNAMIC SELF-OPTIMIZATION OF APPLICATION QUALITY-OF-SERVICE REQUESTS TO MOBILE NETWORKS

(71) Applicant: NEC Laboratories America, Inc., Princeton, NJ (US)

(72) Inventors: Kunal Rao, Monroe, NJ (US); Murugan Sankaradas, Dayton, NJ (US); Srimat Chakradhar, Manalapan, NJ (US); Vivek Aswal, Pittsburgh, PA (US)

(73) Assignee: NEC Corporation

( * ) Notice: Subject to any disclaimer, the term of this patent is extended or adjusted under 35 U.S.C. 154(b) by 0 days.

(21) Appl. No.: 17/958,820

(22) Filed: Oct. 3, 2022

(65) Prior Publication Data

US 2023/0108040 A1   Apr. 6, 2023

Related U.S. Application Data

(60) Provisional application No. 63/402,607, filed on Aug. 31, 2022, provisional application No. 63/251,869, filed on Oct. 4, 2021.

(51) Int. Cl.
*H04L 47/83* (2022.01)
*H04W 28/02* (2009.01)
*H04L 43/0894* (2022.01)
*H04L 41/5019* (2022.01)

(52) U.S. Cl.
CPC .......... *H04L 47/83* (2022.05); *H04L 41/5019* (2013.01); *H04L 43/0894* (2013.01); *H04W 28/0268* (2013.01)

(58) Field of Classification Search
CPC . H04L 47/83; H04L 41/5019; H04L 43/0894; H04W 28/0268
See application file for complete search history.

(56) References Cited

U.S. PATENT DOCUMENTS

| | | | | |
|---|---|---|---|---|
| 10,863,217 | B2* | 12/2020 | Wang | H04N 21/2402 |
| 2005/0063411 | A1* | 3/2005 | Wang | H04L 12/4608 |
| | | | | 370/437 |
| 2006/0075042 | A1* | 4/2006 | Wang | H04L 67/02 |
| | | | | 709/206 |
| 2008/0008188 | A1* | 1/2008 | Buga | H04L 41/046 |
| | | | | 370/395.21 |

(Continued)

OTHER PUBLICATIONS

Ranger, S. (Feb. 3, 2020). What is the IoT? Everything You Need to Know About the Internet of Things Right Now. Feb. 3, 2020. ZDNet.

(Continued)

*Primary Examiner* — El Hadji M Sall
(74) *Attorney, Agent, or Firm* — Joseph Kolodka

(57) ABSTRACT

Systems and methods for network bandwidth optimization, including transmitting sensor data from one or more sensors over a wireless network into a generated network slice, submitting a Quality-of-Service (QoS) request for one or more applications by specifying desired network slice characteristics, and predicting network bandwidth needed for granting the QoS request for the one or more applications using a cost function based on magnitude, direction, and frequency of error. Time-varying network bandwidth usage is continuously monitored, and new QoS requests for the one or more applications are periodically requested based on the monitoring. An updated prediction for updated bandwidth needed for the new QoS request is generated using the cost function, and network bandwidth reservations are iteratively adjusted based on the updated prediction for the new QoS request to provide an amount of network resources to the one or more applications to support the new QoS request.

20 Claims, 6 Drawing Sheets

(56) References Cited

U.S. PATENT DOCUMENTS

| | | | |
|---|---|---|---|
| 2015/0195368 A1* | 7/2015 | Bandyopadhyay | ............................ H04L 43/0805 709/219 |
| 2018/0004456 A1* | 1/2018 | Talwar | .................... G06F 3/067 |
| 2018/0077024 A1* | 3/2018 | Zhang | ................. H04L 41/5003 |
| 2022/0083391 A1* | 3/2022 | Liu | ......................... G06F 9/5027 |
| 2022/0261165 A1* | 8/2022 | Wang | .................... G06F 3/0619 |

OTHER PUBLICATIONS

Tamsons, A. (2020, Jan. 14). How 5G and the Internet of Things can create a winning business. In World Economic Forum. Retrieved from https://www.weforum.org/agenda/2020/01/what-does-5g-and-the-internet-of-things-mean-for-business.

Moosa, I. A., & Burns, K. (2015). Alternative Measures of Forecasting Accuracy, in Demystifying the Meese-Rogoff Puzzle (pp. 44-62). Palgrave Pivot, London.

Joshi, M., & Hadi, T. H. (Jul. 21, 2015). A review of network traffic analysis and prediction techniques. arXiv preprint arXiv:1507.05722.

Sciancalepore, V., Samdanis, K., Costa-Perez, X., Bega, D., Gramaglia, M., & Banchs, A. (May 1, 2017). Mobile traffic forecasting for maximizing 5G network slicing resource utilization. In IEEE INFOCOM 2017-IEEE conference on computer communications (pp. 1-9). IEEE.

Sciancalepore, V., Costa-Perez, X., & Banchs, A. (Jul. 18, 2019). RL-NSB: Reinforcement learning-based 5G network slice broker. IEEE/ACM Transactions on Networking, 27(4), 1543-1557.

* cited by examiner

DYNAMIC SELF-OPTIMIZATION OF APPLICATION QUALITY-OF-SERVICE REQUESTS TO MOBILE NETWORKS

RELATED APPLICATION INFORMATION

This application claims priority to U.S. Provisional App. No. 63/251,869, filed on Oct. 4, 2021, and to U.S. Provisional App. No. 63/402,607, filed on Aug. 31, 2022, each incorporated herein by reference in its entirety.

BACKGROUND

Technical Field

The present invention relates to optimization of Quality-of-Service (QoS) requests to mobile networks, and more particularly to dynamic self-optimization of application QoS requests to 5G networks based on dynamic QoS attribute predictions.

Description of the Related Art 5G networks guarantee Quality of Service (QoS) to applications through network slicing. Network slicing sets up end-to-end logical/virtual networks over a common physical communication infrastructure. Applications can request specific QoS by specifying appropriate network slice attributes like the latency, throughput, bandwidth (guaranteed and maximum), packet error rate, reliability, duration of slice, etc. Applications are charged based on the amount of network resources they request/reserve, and not on the basis of actual amount of network resources used by an application. Network bandwidth needs of video streams from surveillance cameras vary a lot depending on the environmental conditions and the content in the video streams. Conventional systems utilize a one-time fixed network bandwidth reservation, intended to handle the worst-case scenario, which results in a large amount of wastage of requested resources and leads to unnecessary operational cost.

SUMMARY

According to an aspect of the present invention, a method is provided for network bandwidth optimization, including transmitting sensor data from one or more sensors over a wireless network into a generated network slice, submitting a Quality-of-Service (QoS) request for one or more applications by specifying desired network slice characteristics, and predicting network bandwidth needed for granting the QoS request for the one or more applications using a cost function based on magnitude, direction, and frequency of error. Time-varying network bandwidth usage is continuously monitored, and new QoS requests for the one or more applications are periodically requested based on the monitoring. An updated prediction for needed bandwidth for the new QoS request is generated using the cost function, and network bandwidth reservations are iteratively adjusted based on the updated prediction for the new QoS request to provide an amount of network resources to the one or more applications to support the new QoS request.

According to another aspect of the present invention, a system is provided for network bandwidth optimization, including a processor configured for transmitting sensor data from one or more sensors over a wireless network into a generated network slice, submitting a Quality-of-Service (QoS) request for one or more applications by specifying desired network slice characteristics, and predicting network bandwidth needed for granting the QoS request for the one or more applications using a cost function based on magnitude, direction, and frequency of error. Time-varying network bandwidth usage is continuously monitored, and new QoS requests for the one or more applications are periodically requested based on the monitoring. An updated prediction for updated bandwidth needed for the new QoS request is generated using the cost function, and network bandwidth reservations are iteratively adjusted based on the updated prediction for the new QoS request to provide an amount of network resources to the one or more applications to support the new QoS request.

According to another aspect of the present invention, a non-transitory computer readable storage medium including contents that are configured to cause a computer to perform a method for network bandwidth optimization, including transmitting sensor data from one or more sensors over a wireless network into a generated network slice, submitting a Quality-of-Service (QoS) request for one or more applications by specifying desired network slice characteristics, and predicting network bandwidth needed for granting the QoS request for the one or more applications using a cost function based on magnitude, direction, and frequency of error. Time-varying network bandwidth usage is continuously monitored, and new QoS requests for the one or more applications are periodically requested based on the monitoring. An updated prediction for updated bandwidth needed for the new QoS request is generated using the cost function, and network bandwidth reservations are iteratively adjusted based on the updated prediction for the new QoS request to provide an amount of network resources to the one or more applications to support the new QoS request These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
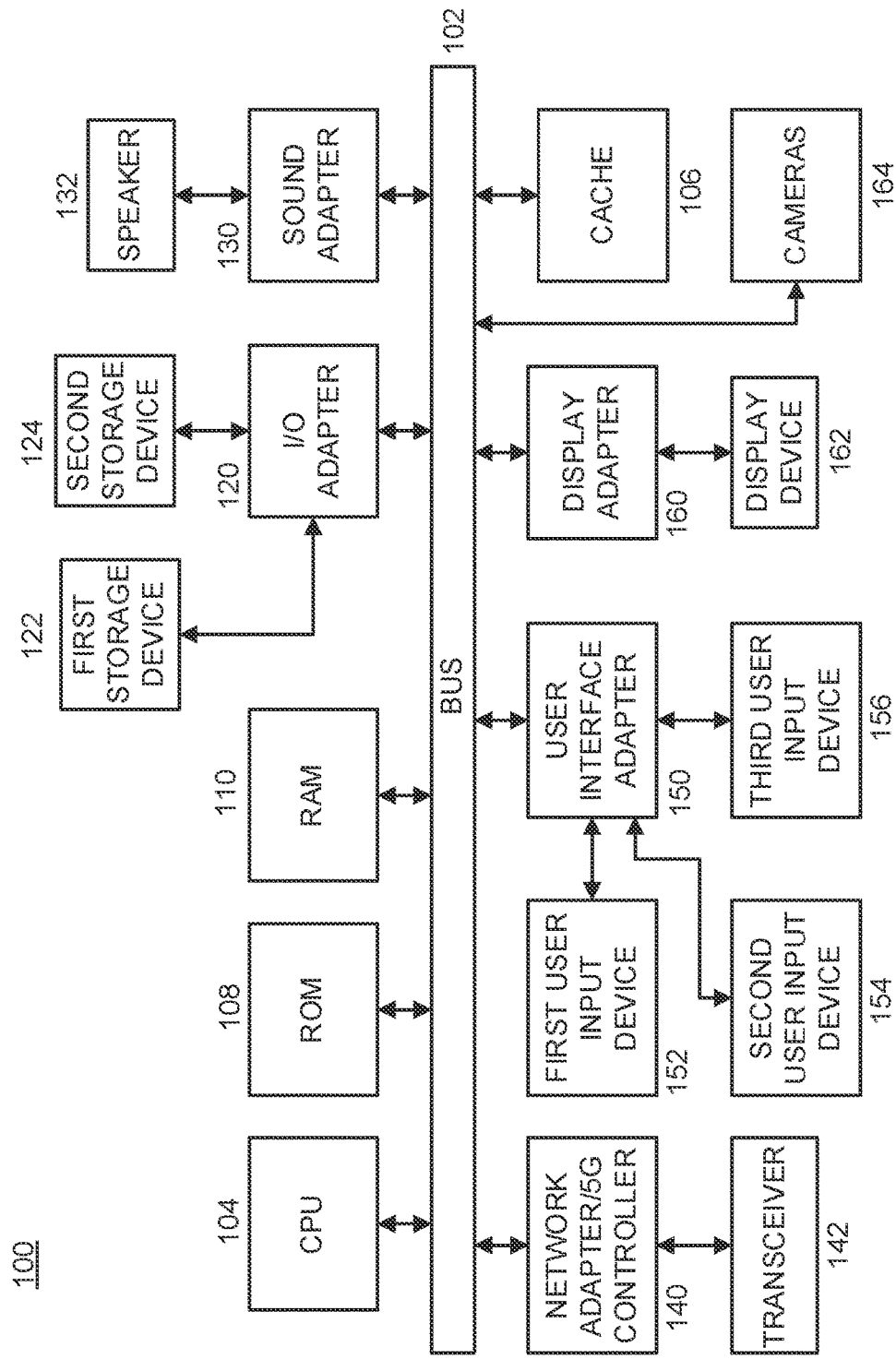
FIG. 1 is a block diagram illustratively depicting an exemplary processing system to which the present invention may be applied, in accordance with embodiments of the present invention.

In accordance with embodiments of the present invention, systems and methods are provided for dynamic self-optimization of application Quality-of-Service (QoS) requests to 5G networks based on dynamic QoS attribute predictions. In some embodiments, a dynamic QoS attribute prediction system and method (e.g., network bandwidth prediction system and method) can assist one or more applications (e.g., analytics applications), including, for example, facial recognition, intelligent transport systems, object detection, remote supervision, etc., to determine and utilize optimal resource reservation requests at all times. The present invention can consider time-varying application needs and can dynamically adjust slice QoS requests to mobile networks (e.g., 5G networks) to ensure an optimal balance between accuracy and performance of an application with operational costs, in accordance with aspects of the present invention.

In some embodiments, a novel cost function, which can take into account and utilize magnitude, direction, and frequency of oversubscription and/or undersubscription of network bandwidth needs, can be utilized for network bandwidth prediction and continuous, real-time optimization of one or more network bandwidth requests to 5G networks, in accordance with aspects of the present invention. In accordance with various embodiments, the present invention can reduce operational cost of usage of 5G networks for applications by considering time-varying application needs and dynamically adjusting slice QoS requests to 5G networks to ensure a balance between application accuracy and operational costs and dynamically self-optimizing application QoS requests to the 5G networks.

In various embodiments, as will be described in further detail herein below, the present invention can be utilized to reduce wastage of network bandwidth subscriptions, prevent oversubscription of network bandwidth usage, reduce oversubscription magnitude and frequency, change network bandwidth requests to 5G networks as the environment and data content (e.g., video content) changes. In some embodiments, a cost function can be defined and utilized which can simultaneously take into account magnitude, direction, and frequency of error. In an embodiment, oversubscription can be penalized more than undersubscription, and can be penalized in a reverse manner in other embodiments.

In various embodiments, the present invention can monitor network bandwidth usage for past t time intervals, can calculate and utilize a mean of the magnitude of oversubscription for the past t time intervals for formulation of network bandwidth prediction requests for a next interval where there is an identified trend (e.g., downward, upward, static) in network bandwidth usage, and can select a particular magnitude (e.g., highest, lowest, middle, etc.) of the network bandwidth as a baseline. A calculated mean can be added to the baseline and utilized as a network bandwidth prediction for a next interval where there is a detected trend (e.g., upward, downward, static), in accordance with aspect of the present invention.

Smart sensors (or devices) sense and produce raw data streams that are being used for various types of analytics. These sensors or "things" are connected to the Internet, giving rise to a new paradigm called Internet of Things (IoT). The total number of IoT devices in the world is estimated to grow to 41.6 billion by the year 2025 and the amount of data generated from these devices is expected to grow to 79.4 zettabytes by 2025. All this data from so many IoT devices is typically transmitted over 5G networks to a remote location for analytics processing.

With the advent and growth of 5G, the rate at which these IoT devices are being installed and deployed has suddenly accelerated. By the year 2025, it has been predicted that approximately 5 billion IoT devices will be connected over cellular network. The promise of 5G to pack over 1 million IoT devices in 1 square kilometer (massive Machine Type Communication—"mMTC"), coupled with Ultra Reliable Low Latency ("uRLL") and Enhanced Mobile Broadband ("eMBB"), is driving the deployment of numerous IoT sensors and design of new applications, which were not possible before. For example, consider Intelligent Transportation Systems (ITS), which is a new and emerging application. It is leveraging 5G and IoT sensors to improve various aspects in transportation, including autonomous driving, collision avoidance, traffic planning, etc. Several AR/VR (augmented reality, virtual reality) applications are also emerging, wherein high bandwidth video data transmission and low latency response times are possible due to 5G. Such a scenario of emerging, new applications can be utilized in a city-scale deployment of sensors (with data being transmitted over 5G for remote processing) to optimize network resource (e.g., bandwidth) usage, in accordance with aspects of the present invention.

In a majority of applications, the network bandwidth needed for transporting the raw data streams produced by sensors is generally time-varying because the amount of sensor data changes depending on the environmental conditions and content in the data streams. For example, in an embodiment including a video surveillance application, the bit rate of the video data stream can change depending on the observed scene. If there is no change or relatively less change from one frame to another, then the bit rate drops, whereas, if there is quite a lot of activity and significant changes occur between frames, then the bit rate can increase substantially. This is an artifact of the compression algorithms used within the video cameras, and the amount of data produced by the camera can vary significantly over a period of time.

5G networks guarantee Quality of Service (QoS) to applications through network slicing. Network slicing sets up end-to-end logical/virtual networks over a common physical communication infrastructure. Applications can request specific QoS by specifying appropriate network slice attributes like the latency, throughput, bandwidth (guaranteed and maximum), packet error rate, reliability, duration of slice, etc. Once a slice is created for an application, this network slice can be isolated from other slices, since the network slice has dedicated virtual network resources. Applications are generally charged based on the amount of network resources they request/reserve, and not on the basis of actual amount of network resources used by an application. Thus, it is in the best interest of the application to request only resources that it will actually use (e.g., to save operational costs).

Desired behavior for any application is generally that there should be minimal or no oversubscription (e.g., actual network bandwidth need should not exceed the reserved bandwidth) and that there should also be minimal or no undersubscription (e.g., bandwidth used by the application is the same or close to the reserved bandwidth to avoid paying for unused but reserved network bandwidth). As an added incentive, if the application requests fewer network resources, then the chances of 5G network granting the request can be much higher.

In some embodiments, the present invention can utilize a novel QoS request prediction technique, which includes a network bandwidth prediction technique that any analytics application can utilize to dynamically self-optimize application QoS requests to 5G networks. A new cost function, which can take into account the magnitude, direction and frequency of the oversubscription or undersubscription, enables the design and utilization of a novel prediction technique that continuously optimizes the network bandwidth requests to 5G networks, in accordance with aspects of the present invention. In a real-world deployment of a video analytics application over 17 cameras, the adaptive prediction technique of the present invention outperforms conventional forecasting methods, and saves 34% of network bandwidth (over approximately a 24-hour time period) when compared with a one-time static bandwidth request at the time of creation of the slice, as utilized by conventional forecasting systems and methods.

Applications (e.g., analytics applications) can tailor a network slice by specifying a variety of QoS attributes related to application-specific performance, function, or operation. However, some QoS attributes like guaranteed bandwidth needed by the application do vary over time. For example, network bandwidth needs of video streams from surveillance cameras can vary a lot depending on the environmental conditions and the content in the video streams. In various embodiments, the present invention can utilize a novel, dynamic QoS attribute prediction technique that assists any application to make optimal resource reservation requests at all times.

Conventional forecasting and resource allocation techniques have been utilized to assist a network operator to optimize network slicing in 5G networks. These techniques are tailored toward 5G network infrastructure providers/operators, and can be utilized to efficiently handle slicing requests from multiple applications (e.g., multi-tenancy). However, these techniques are designed and applied from a 5G network operator's perspective. In contrast, in various embodiments, the present invention is application-centric rather than infrastructure or 5G network operator-centric, and can be utilized by any application to dynamically self-adapt the network slice QoS requests over a variety of carrier or private 5G network operators, in accordance with aspects of the present invention.

Conventional forecasting uses traditional error metrics and cost functions to evaluate prediction accuracy, including, for example, Mean Absolute Error (MAE), Mean Square Error (MSE), Root Mean Square Error (RMSE), Normalized Root Mean Square Error (NRMSE), Mean Percentage Error (MPE) and Mean Absolute Percentage Error (MAPE). These metrics focus on absolute error, and optimization techniques try to keep the error as low as possible, without considering the direction or frequency of the error. This technique can be utilized for some scenarios, but cannot be utilized in any scenario in which the direction as well as the frequency of error is important and is utilized, as in the present invention.

Conventional forecasting methods do not function optimally at least because they do not take into account the direction (e.g., whether the forecasting of resources is more or less than needed), magnitude (e.g., by how much the forecast deviates, and in which direction), or frequency (e.g., how many times the forecast deviates from actual needs, and in which direction) during the forecasting. The direction, magnitude and frequency can have a direct impact on the application's accuracy of insights, and the operational costs. In some embodiments, the present invention can utilize a parameterized cost function that takes into account all three of the direction, magnitude, and frequency, which can all be utilized in the prediction techniques of the present invention. In contrast to conventional systems, the present invention can account for time-varying application needs, and can dynamically adjust slice QoS requests to 5G networks to provide an optimal balance between application accuracy and operational costs, in accordance with aspects of the present invention.

In various embodiments, the present invention does not use the traditional error metrics and instead defines and utilizes a novel cost function to capture the tradeoff between accuracy of insights and operational costs. This cost function can be utilized to guide the design of a new prediction technique. Unlike conventional prediction techniques, the prediction technique of the present invention can prioritize reduction in magnitude and frequency of oversubscription (e.g., direction), which is more critical than undersubscription in video analytics applications, in accordance with aspects of the present invention. For example, if there is oversubscription, this can lead to degradation of application accuracy, as there will be a loss of data. Thus, it is critical to avoid oversubscription as much as possible in practice.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more cameras 164 can be further coupled to system bus 102 by any appropriate connection system or method (e.g., Wi-Fi, wired, network adapter, etc.), in accordance with aspects of the present invention A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 300, and 600, described below with respect to FIGS. 2, 3, and 6, respectively, are systems for implementing respective embodiments of the present invention. Part or all of processing system 100 may be implemented in one or more of the elements of systems 200, 300, and 600, in accordance with aspects of the present invention.

Figure 3:
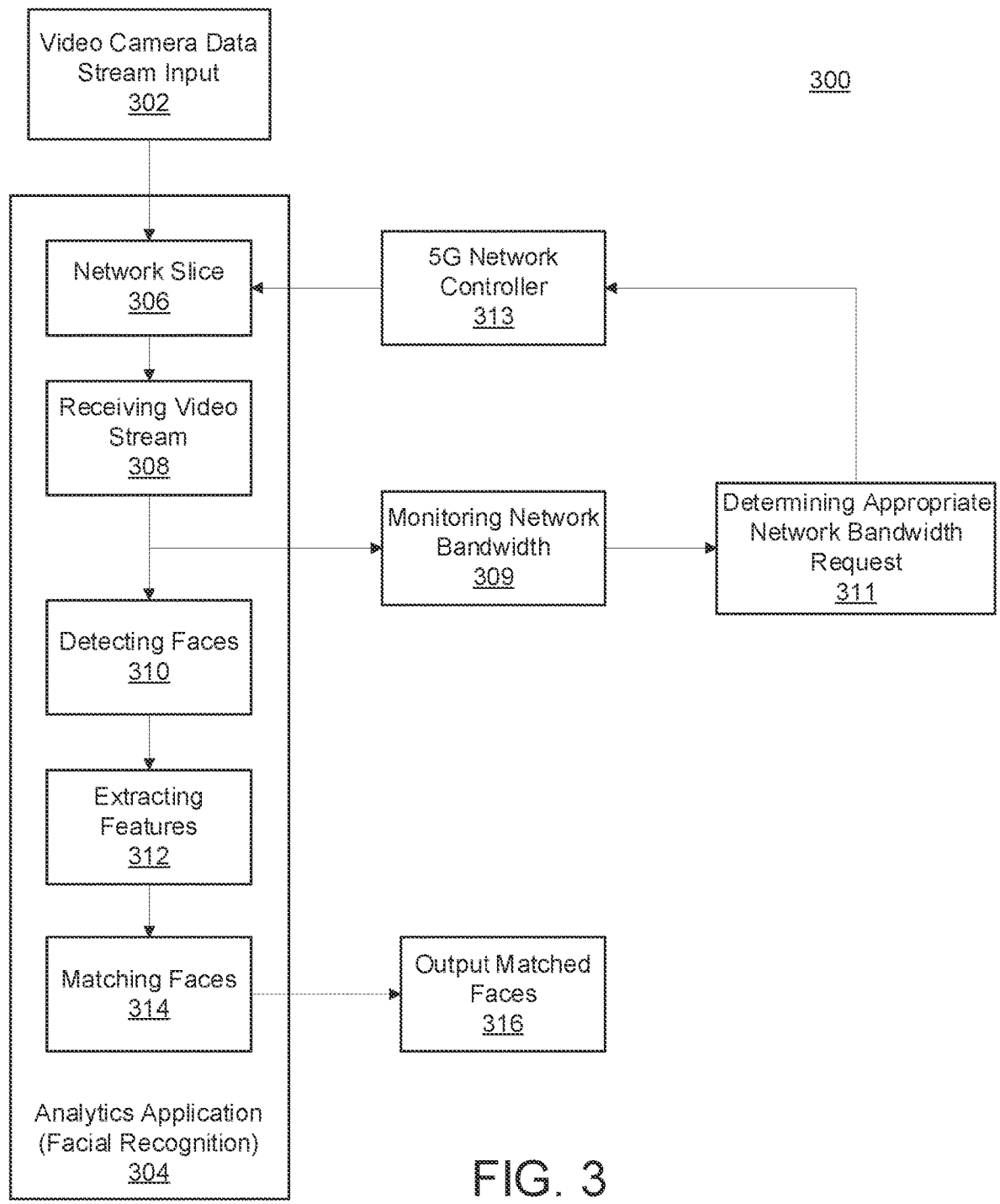
FIG. 3 is block/flow diagram illustratively depicting a system and method for dynamic self-optimization of application QoS requests to 5G networks for a facial recognition application, in accordance with embodiments of the present invention.
Figure 5:
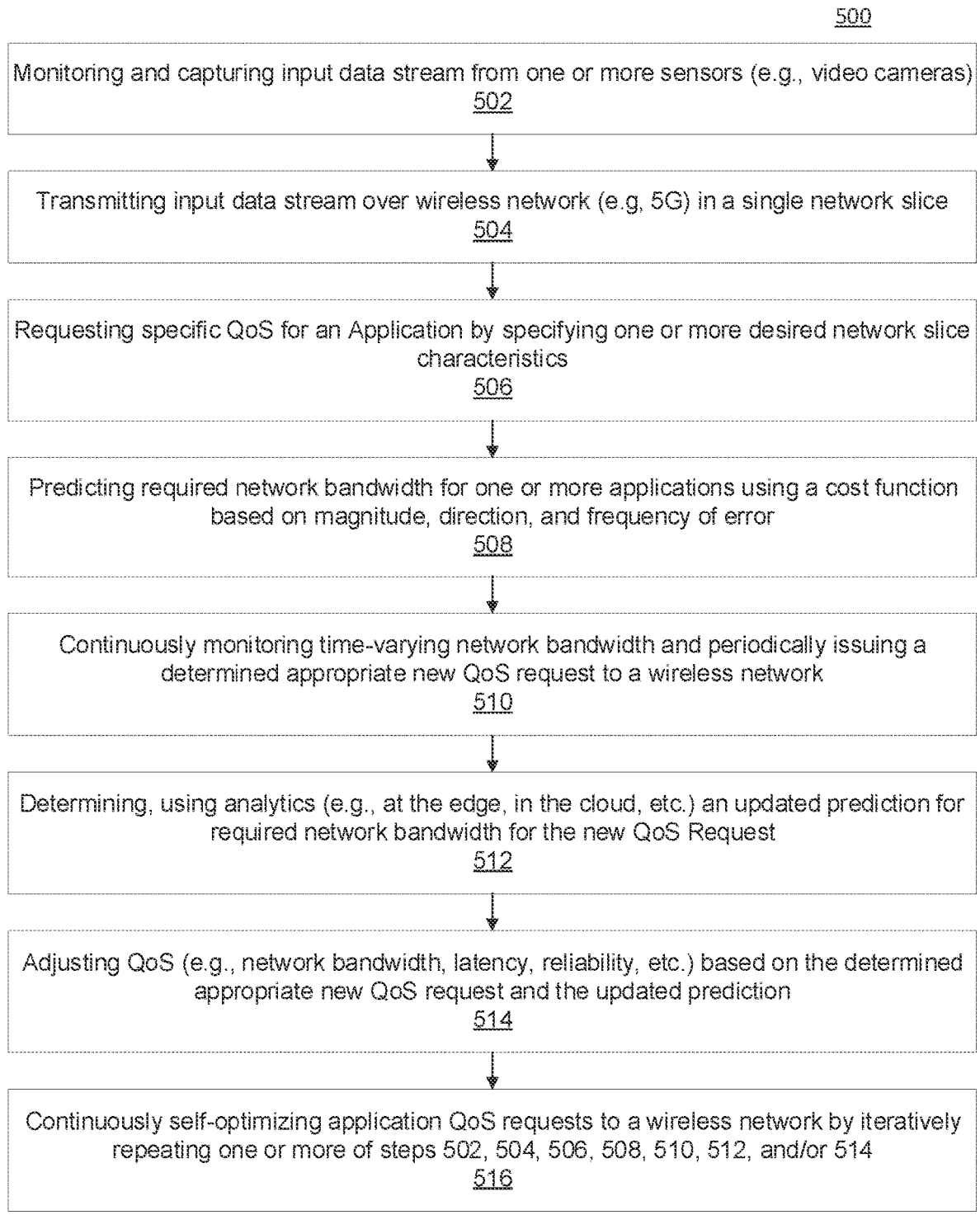
FIG. 5 is a block/flow diagram illustratively depicting a method for dynamic self-optimization of application QoS requests to 5G networks, in accordance with embodiments of the present invention.

Further, it is to be appreciated that processing system 100 may perform at least part of the methods described herein including, for example, at least part of methods 300 and 500 of FIGS. 3 and 5, respectively. Similarly, part or all of systems 200, 300, and 600 may be used to perform at least part of methods 300 and 500 of FIGS. 3 and 5, respectively, in accordance with aspects of the present invention.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
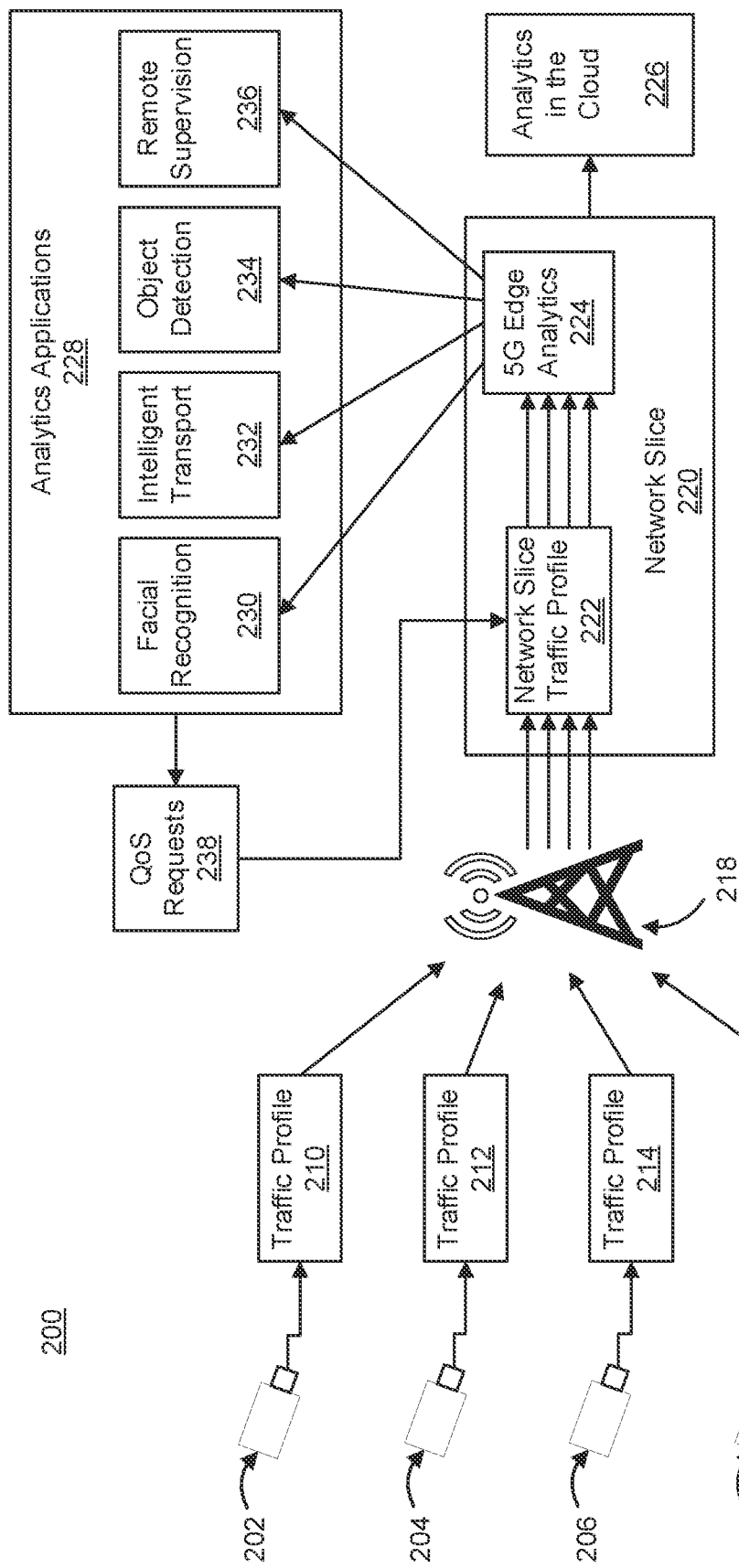
FIG. 2 is a diagram illustratively depicting a high-level system architecture for dynamic self-optimization of application QoS requests to 5G networks, in accordance with embodiments of the present invention.

Referring now to FIG. 2, a high-level system architecture 200 for dynamic self-optimization of application QoS requests to 5G networks is illustratively depicted in accordance with embodiments of the present invention.

In one embodiment, streaming data from one or more sensors (e.g., cameras 202, 204, 206, and 208) can be utilized in a sensor array 201, and traffic profiles 210, 212, 214, and 216 of the sensors 202, 204, 206, and 208, respectively, can be captured and made available to one or more applications by a wireless network 218 (e.g., 5G network) in a single network slice 220, which can include a network slice traffic profile 222, and Analytics at the Edge 224 (e.g., 5G Edge) can be executed in real-time to determine optimal network resource usage, in accordance with aspects of the present invention.

In various embodiments, the Analytics at the Edge 224 can be applied to, and function with any of a plurality of analytics applications, including, for example, facial recognition, intelligent transport systems, object detection (e.g., for self-driving vehicles), remote supervision, etc. One or more updated QoS requests 238 can be iteratively determined by the analytics applications 228 based on, for example, optimal latency, bandwidth, and/or reliability needs of one or more of the analytics applications 228. In various embodiments, the updated QoS requests 238 can be issued through the network slice 220 over the 5G network 218 for further analytics at the edge 224 and/or analytics in the cloud 226, in accordance with aspects of the present invention.

In some embodiments, data streams from a plurality of sensors 201 (e.g., cameras 202, 204, 206, and 208) can be sent over a 5G network 218 into a network slice 220 that has been set up by the 5G network 218 for use by one or more analytics applications 228, which can have tasks running at the edge in block 224. Depending on the network bandwidth needs of the sensors 202, 204, 206, and 208, the application 230, 232, 234, and/or 236 can adapt and periodically issue updated QoS requests to the 5G network, in accordance with aspects of the present invention.

For example, in one embodiment, a facial recognition application 230 can monitor and analyze a video stream received from one or more sensors 202, 204, 206, and 208 and identify/recognize faces in the video stream based on, for example, a pre-registered gallery of faces stored in a computer-readable storage medium (e.g., hard disk, portable disk drive, cloud, etc.), in accordance with aspects of the present invention. Further details regarding utilizing a facial recognition application 230 in accordance with various embodiments of the present invention are described herein below with reference to FIG. 3.

In an embodiment, one or more video streams received from one or more cameras 202, 204, 206, and 208 can be made available to the facial recognition application 230 by the 5G network in a single network slice 220, whose QoS attributes can be periodically updated by the facial recognition application in response to one or more QoS requests 238 by the application 230 to ensure optimal use of the reserved network resources. For example, the bit rate of the video can be low during the night (e.g., when there is generally little or no movement of people or other things in front of the camera). However, the bit rate can be comparatively much higher during the day (e.g., when people or other things are generally moving in front of the camera). This time-varying, dynamic network traffic 210, 212, 214, and 216 can be monitored by the face recognition application 230 and thus, the bandwidth reserved at night can be much lower than the bandwidth reserved during the day, in accordance with aspects of the present invention. Utilizing different network bandwidth reservations during the night and day can lead to significant network bandwidth savings, with essentially no effect on the accuracy of insights from the facial recognition application 230, in accordance with aspects of the present invention.

Referring now to FIG. 3, a system and method for dynamic self-optimization of application QoS requests to 5G networks for a facial recognition application 300 is illustratively depicted in accordance with embodiments of the present invention.

In one embodiment, video camera data stream input 302 can be passed through a 5G network slice 306 and the video stream can be received (e.g., by an application) prior to any further analysis being performed. Network bandwidth generally varies as the environment and video content changes, and such variations in network bandwidth is monitored in block 309, and an appropriate network bandwidth request can be determined in block 311. The determined appropriate network bandwidth request from block 311 can be periodically issued to a 5G network controller 313, and the network controller 313 can adjust the QoS (e.g., network bandwidth in this example) of the 5G network slice 306 according to the request from block 311, in accordance with aspect of the present invention.

In some embodiments, after the QoS of the 5G network slice 306 has been adjusted by the network controller 313, the video stream can be received in block 308 and proceed to perform facial recognition using an analytics application in block 304. The facial recognition analytics application 304 can detect faces from the received video stream in block 310, extract features from the detected faces in block 312, match one or more faces in block 314, and output matched faces in block 316, in accordance with aspects of the present invention.

Figure 4:
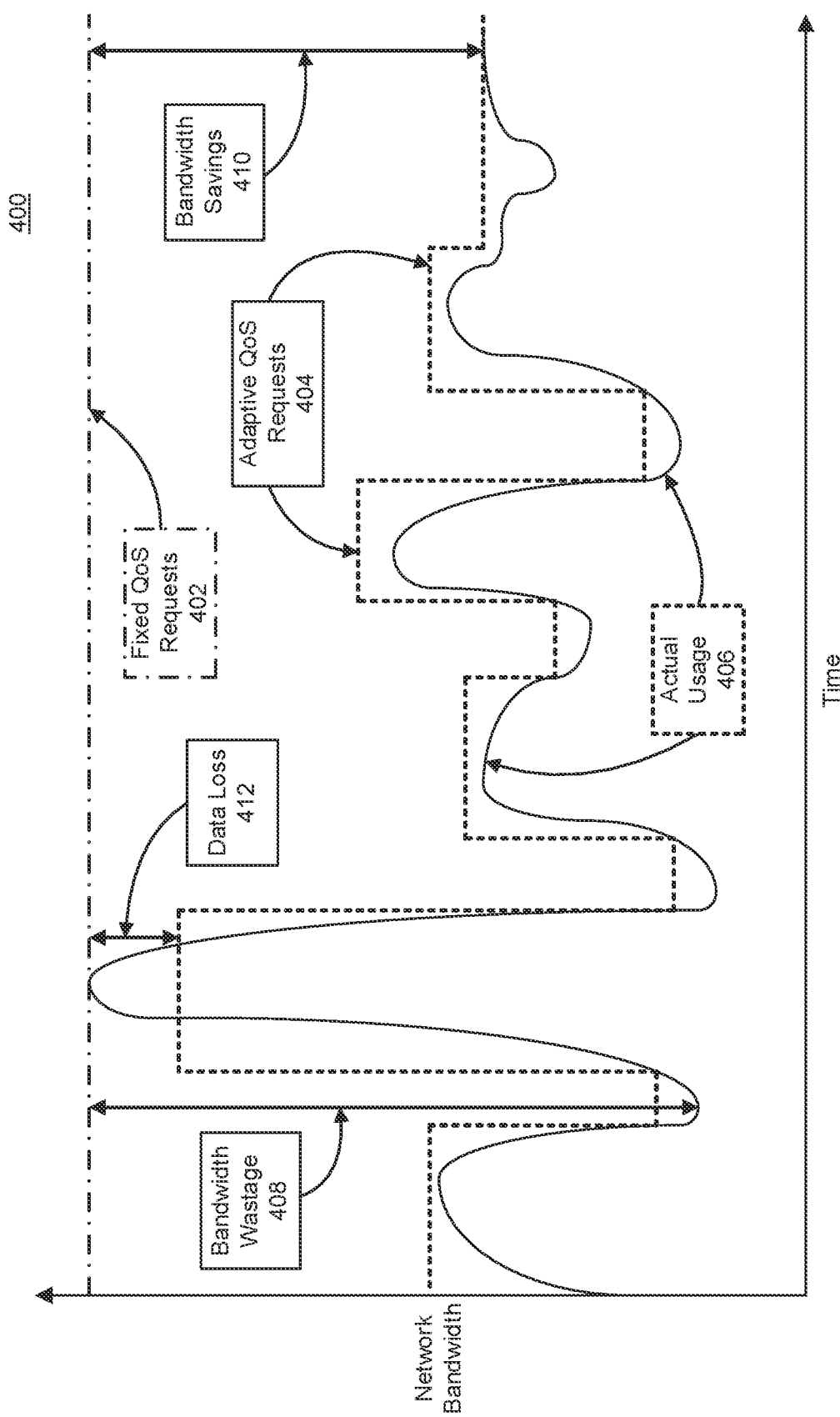
FIG. 4 is graph illustratively depicting exemplary application network bandwidth needs and usage over time for adaptive and fixed QoS requests, in accordance with embodiments of the present invention.

Referring now to FIG. 4, a graph 400 showing exemplary application network bandwidth needs and usage over time for adaptive and fixed QoS requests is illustratively depicted in accordance with embodiments of the present invention.

In accordance with various embodiments, a goal of the present invention is for an application to have minimum or no oversubscription and minimum or no undersubscription to avoid any data loss 412 (which can result in loss of accuracy of insights from the application), or bandwidth wastage 408 (e.g., non-usage of guaranteed network resources). Without advance knowledge of the network traffic profile and the usage pattern, a method to issue QoS requests to 5G networks in order to prioritize accuracy over cost is to request the worst case needed network bandwidth by a Fixed QoS request 402 for a particular network bandwidth. In response to such a request, the 5G network can grant the worst case needed network bandwidth for the Fixed QoS request 402, if available, and then the application may choose to use it however it wants. However, the actual network traffic usage 406 (e.g., actual usage) generally varies substantially over time, and thus there can often be surplus network bandwidth reserved which can result in bandwidth wastage 408. The surplus can cause additional operational costs due to the bandwidth wastage 408, and thus, it is desirable to avoid such costs.

In various embodiments, to reduce bandwidth wastage 408, instead of issuing a one-time, worst case needed network bandwidth request to the 5G network as a Fixed QoS request 402, QoS requests can be periodically sent to the 5G network, each time adapting and predicting the needed network bandwidth (e.g., for a particular application or applications), and then issuing adaptive QoS requests 404 which can be based on the predicted network bandwidth. Dynamic, real-time, adaptation of adaptive QoS requests 404 (e.g., modulation of QoS requests) can provide significant bandwidth savings 410 in accordance with aspects of the present invention. However, often times, if the prediction is less than the network bandwidth actually needed (e.g., actual usage 406), then there could be some data that won't be transmitted, and data loss 412 can occur. Notwithstanding any data loss 412, usage of adaptive QoS requests 404 can provide substantial network bandwidth savings, and significant reduction of overall operational costs for the application, in accordance with aspects of the present invention.

Referring now to FIG. 5, a method 500 for dynamic self-optimization of application QoS requests to 5G networks is illustratively depicted in accordance with embodiments of the present invention.

In an embodiment, an input data stream from one or more sensors (e.g., video cameras, proximity sensors, infrared sensors, microphones, velocity sensors, etc.) can be monitored and captured in block 502. In block 504, the input data stream can be transmitted over a wireless network (e.g., 5G network) in a single network slice. Specific QoS requests (e.g., adaptive QoS requests) for an application can be requested by specifying one or more desired network slice characteristics in block 506. In block 508, network bandwidth needed for one or more applications can be predicted using a cost function based on at least magnitude, direction, and frequency of error.

There are several forecasting methods used in various domains like weather prediction, hardware failure prediction, and exchange rate prediction in economics or finance. In each case, it is desirable that the predicted value be as close as possible to the actual value. A cost function is generally minimized or maximized in order to achieve the desired prediction results, and cost functions are designed around traditional error metrics like Mean Absolute Error (MAE), Mean Absolute Percentage Error (MAPE), Mean Squared Error (MSE), Root Mean Squared Error (RMSE), Mean Direction Accuracy (MDA) and Adjusted Root Mean Squared Error (ARMSE).

The cost functions typically consider the magnitude or direction of the error, or some combination thereof. For example, MAE is the average of the residuals or the absolute error (e.g., the difference between the predicted and actual value) and it considers only the magnitude of the error. It does not take into account the direction of the error (e.g., whether the predicted value is higher or lower than the actual value), or the frequency (e.g., how often the predicted value deviates from the actual, and in which direction). Similarly, MAPE also focuses on the percentage of the magnitude of the error, without considering direction or frequency. MSE is another error metric that is the average of the squared error, and it measures the variance of the residuals.

Similarly to MAE, MSE also does not take into account the direction or frequency. RMSE is the square root of MSE, and it measures the standard deviation of the residuals. MSE and RMSE penalize large prediction errors more, compared to MAE. Lower values of MAE, MSE and RMSE correspond to better predictions. Unlike MAE, MSE and RMSE, MDA considers the direction of the predicted value, and it is a popular forecasting performance metric in economics and finance. MDA captures the upward or downward trend, but it is does not account at all for the magnitude or frequency of the error. AMRSE attempts to combine magnitude and direction, but it does not account for frequency. Thus, it is clear that no conventionally utilized cost functions can simultaneously consider the magnitude, direction, and frequency of the error.

In accordance with various embodiments, the present invention can simultaneously consider and account for the magnitude, direction, and frequency of the error using a novel cost function for the predicting in block 508. The amount of actual network bandwidth usage (whether it is over or under the reserved network bandwidth), and how frequently the predicted usage is over or under the actual usage can be important to minimize the operating costs of the application and avoid loss of accuracy of insights due to data loss. In an embodiment, predicting usage that is less than the actual usage can be critical because it can lead to undesirable loss in accuracy of insights produced by the analytics application.

In an embodiment, in block 508, a novel cost function that takes into account the magnitude, direction, and frequency of the error can be utilized to, for example, minimize the operating costs of one or more applications and avoid loss of accuracy of insights due to data loss. The cost function can be represented as shown in Equation 1 below:

$$C_{total} = \sum_{t \in T} F_u \times (GBR_t - A_t) \otimes P_u + \sum_{t \in T} F_o \times (A_t - GBR_t) \otimes P_o \quad (1)$$

$$F_u = \begin{cases} 1, & \text{if, } GBR_t > A_t \\ 0, & \text{otherwise} \end{cases} \text{ and } F_o = \begin{cases} 1, & \text{if, } A_t > GBR_t \\ 0, & \text{otherwise} \end{cases}, \quad (2)$$

where $C_{total}$ represents a total cost, t represents a time unit in a total duration T, $F_u$ represents a flag for undersubscription, $F_o$ represents a flag for oversubscription, $A_t$ represents actual value, $GBR_t$ represents reserved guaranteed bandwidth, $P_u$ represents a penalty cost for undersubscription, and $P_o$ represents a penalty cost for oversubscription, in accordance with aspects of the present invention.

In various embodiments, for each time unit t in the total duration T, undersubscription or oversubscription can be determined in accordance with aspects of the present invention. The flag $F_u$ can be set to 1 if there is undersubscription (e.g., actual value ($A_t$) is less than reserved guaranteed bandwidth (GBR) value $GBR_t$). The flag $F_o$ can be set to 1 if there is oversubscription (e.g., actual value ($A_t$) is greater than the GBR value $GBR_t$. Both $F_u$ and $F_o$ can be set to zero otherwise, as shown in Equation 2 above).

In some embodiments, every time there is undersubscription, it can be penalized with a cost of Pu and every time there is oversubscription, it can be penalized with a cost of Po, with the penalty being applied to the actual amount of either undersubscription or oversubscription. The penalty for oversubscription can generally be much higher than the penalty for undersubscription since oversubscription directly adversely affects the accuracy of analytics. In practice, it is desirable for the oversubscription to be minimal, so that the accuracy of the analytics is not adversely affected. However, undersubscription can lead to wastage of resources and higher operational costs due to excess reservation of network bandwidth. Therefore, there is penalty for undersubscription too. However, this penalty is typically not as critical or large as the penalty for oversubscription. The actual penalty values can be configured depending on the relative importance of over and under subscription in the specific application, and can be customized by a user and/or application in accordance with aspects of the present invention. The total cost can be represented as the sum of costs incurred for undersubscription and oversubscription, and lower the total cost, the better (e.g., more accurate) is the prediction.

Different prediction techniques and models (e.g., ARMA, ARIMA, GARCH, Neural-network based, Linear regression, Support Vector Regression using linear and non-linear kernels (e.g., RBF, Decision Tree based regression, Adaboost regression, etc.)) are conventionally used and applied to predict network traffic. However, these prediction techniques do not account for the vastly different impact of oversubscription or undersubscription of network resource usage on the operating costs and accuracy of insights from the analytics application.

In various embodiments, the present invention utilizes a novel prediction technique in blocks 508 and 512, which analytics applications can use to dynamically self-optimize application's QoS requests to 5G networks in accordance with aspects of the present invention. The prediction technique can adequately and accurately take into account the operating costs as well as the accuracy of insights from the analytics applications. As discussed above, oversubscription impacts the accuracy of the application and therefore is more critical. Thus, in the above-described cost function, a higher penalty can be assigned for oversubscription.

In one embodiment, the prediction method of blocks 508 and 512 can reduce oversubscription magnitude as well as frequency by using the maximum network bandwidth that was actually utilized by the application in the previous interval as the predicted network bandwidth for the next interval.

In one embodiment, a simple prediction method, herein referred to as a "Max" prediction method, which considers and adjusts to the upward or downward trend of the network bandwidth usage, can be utilized. The "Max" prediction method uses the maximum network bandwidth that was actually utilized by the application during the previous interval as the predicted network bandwidth for a next interval. However, this method it is still very coarse grained and may result in higher oversubscription or undersubscription, both in terms of magnitude as well as frequency. This is at least in part because the network traffic may jump up or drop down at a very fast rate, and this is not easily captured quickly by the "Max" prediction technique. Furthermore, blindly using the maximum may lead to significant undersubscription.

In accordance with various embodiments, to optimize network resource availability and usage (e.g., adjust to a rapid change in the rate of network bandwidth usage, avoid too much undersubscription, and in general to capture the upward or downward trend of the network bandwidth usage at a more fine-grained level), another prediction technique can be utilized in accordance with aspects of the present invention. This additional prediction method is referred to herein as a "Modified-Max" prediction method 508, 512. In the "Modified-Max" prediction method 508, 512, instead of blindly using the maximum network bandwidth that was utilized by the application in the previous interval (e.g., as in the "Max" prediction method), the predicted network bandwidth for the past t time intervals can be utilized in accordance with aspects of the present invention.

For the above-mentioned i-time intervals, it can be determined if there were any trends (e.g., upward, downward, static) of the network bandwidth usage by continuously monitoring time-varying network bandwidth and periodically issuing a determined appropriate new QoS request to a wireless network (e.g., 5G network). In some embodiments, to be conservative and prevent future oversubscription, it can be considered that there is an upward trend even if it is determined that there is just one (or more than one) occurrence of oversubscription in the past t time intervals. If an upward trend is detected/determined, the mean of the magnitude of oversubscription above the predicted value of all occurrences of oversubscription can be calculated.

In some embodiments, the highest magnitude or the maximum of the network bandwidth utilized can be selected as a baseline for a next prediction (e.g., updated prediction in block 512 for needed network bandwidth for a new QoS request from an application), the calculated mean can be added to this baseline, which can adjust or modify the maximum, and this modified maximum can then be selected as the next network bandwidth prediction. In various embodiments, the "Modified-Max" prediction technique also takes into account the downward trend (e.g., when there is no oversubscription observed in the past t time intervals). When there is a downward trend, then the mean of the magnitude of undersubscription below the predicted value of all occurrences of undersubscription can calculated. This mean can then be subtracted from the baseline, which is the highest magnitude, or the maximum of the network bandwidth utilized by the application. This new "modified maximum" can then be chosen as the prediction for the next interval. Thus, when there is an upward trend, "Modified-Max" technique can raise the predicted network bandwidth for next interval above the baseline, while for downward trend, it can lower the predicted network bandwidth below the baseline, thereby, capturing the rapid change in the rate of network bandwidth usage as well as capturing the upward or downward trend in a much finer granularity than conventional systems and methods, in accordance with aspects of the present invention.

In block 512, a QoS for network resources (e.g., bandwidth, latency, reliability, etc.) can be iteratively adjusted based on the predictions in block 508 and 514, and network resources can be allocated according to the updated QoS and the predictions, in accordance with aspects of the present invention. In block 516, application QoS requests to a wireless network (e.g., 5G) can be continuously self-optimized by iteratively repeating one or more of steps 502, 504, 506, 508, 510, 512, and/or 514 in accordance with aspects of the present invention.

Figure 6:
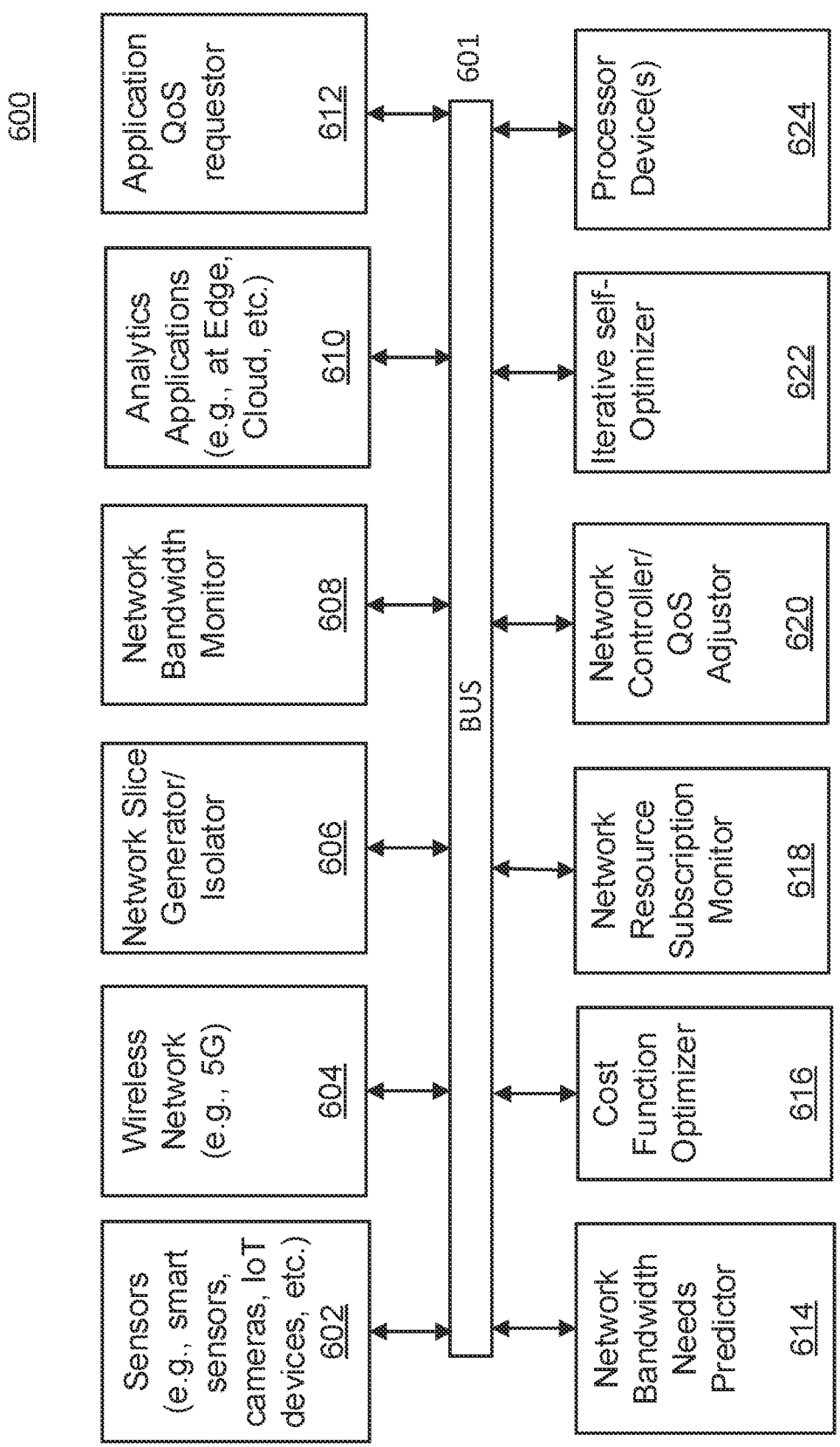
FIG. 6 is a block diagram illustratively depicting a high-level system for dynamic self-optimization of application QoS requests to 5G networks, in accordance with embodiments of the present invention.

Referring now to FIG. 6, a system 600 for dynamic self-optimization of application QoS requests to 5G networks is illustratively depicted in accordance with embodiments of the present invention.

In some embodiments, one or more sensors 602 (e.g., smart sensors, cameras, IoT devices, etc.) can collect data, and data streams from the sensors 602 can be transmitted over a wireless network 604 (e.g., 5G) into a network slice set up by a network slice generator/isolator 606. A network bandwidth monitor 608 can monitor network traffic for one or more analytics applications 610 (e.g., facial recognition, intelligent transport, object detection, remote supervision, etc.), and determine network bandwidth needs for one or more of the Analytics applications 610.

In various embodiments, an application QoS requestor 612 can periodically issue updated QoS requests to the wireless network based on determined network bandwidth needs for the one or more analytics applications 610, and the network bandwidth needs can be determined by a network bandwidth needs predictor 614, in accordance with aspects of the present invention. A cost function optimizer 616 can be utilized to generate and apply a cost function for use by the network bandwidth needs predictor 614 in determining optimal network bandwidth needs and/or usage. Various functionality of the prediction and cost function implemented by the network bandwidth needs predictor 614 and the cost function optimizer 616, respectively, is further described above with reference to blocks 508 and 512 of FIG. 5, in accordance with aspects of the present invention.

In some embodiments, a network resource subscription monitor 618 can be utilized to determine whether there is any undersubscription or oversubscription of network resources. A network controller/QoS adjustor 320 can adjust deployment and usage of network resources and/or QoS requests for any of a plurality of reasons (e.g., application QoS requests, a determination of oversubscription or undersubscription, updated bandwidth needs predictions, etc.) to optimize network usage. A continuous self-optimizer 622 can continuously self-optimize the network in real time, using a continuous self-optimizer, by continuously monitoring network bandwidth and adjusting QoS requests and deployment of network resources based on at least predicted network bandwidth needs from block 614, in accordance with aspects of the present invention.

In the embodiment shown in FIG. 6, the elements thereof are interconnected by a bus 601. However, in other embodiments, other types of connections can also be used. Moreover, in an embodiment, at least one of the elements of system 600 is processor-based and/or a logic circuit and can include one or more processor devices 624. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 600 are readily determined by one of ordinary skill in the art, given the teachings of the present principles provided herein, while maintaining the spirit of the present principles.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for network bandwidth optimization comprising:
transmitting sensor data from one or more sensors over a wireless network into a generated network slice;
submitting a Quality-of-Service (QoS) request for one or more applications by specifying desired network slice characteristics;
predicting network bandwidth needed to grant the QoS request for the one or more applications using a cost function based on magnitude, direction, and frequency of error;
continuously monitoring time-varying network bandwidth usage and periodically issuing new QoS requests for the one or more applications based on the monitoring;
generating an updated prediction for an updated bandwidth needed for the new QoS request using the cost function; and
iteratively adjusting network bandwidth reservations based on the updated prediction for the new QoS request to provide an amount of network resources to the one or more applications to support the new QoS request.

2. The method as recited in claim 1, wherein the wireless network is a 5G network.

3. The method as recited in claim 1, wherein the predicting the network bandwidth needed for granting the QoS request further comprises identifying any oversubscription or undersubscription of network resources to optimally balance application accuracy and network operational cost.

4. The method as recited in claim 1, wherein the cost function is represented as follows:

$$C_{total} = \sum_{t \in T} F_u \times (GBR_t - A_t) \otimes P_u + \sum_{t \in T} F_o \times (A_t - GBR_t) \otimes P_o,$$

where $C_{total}$ represents a total cost, t represents a time unit in a total duration T, $F_u$ represents a flag for undersubscription, $F_o$ represents a flag for oversubscription, $A_t$ represents actual value, $GBR_t$ represents reserved guaranteed bandwidth, $P_u$ represents a penalty cost for undersubscription, and $P_o$ represents a penalty cost for oversubscription.

5. The method as recited in claim 3, wherein the undersubscription is identified by an actual value $A_t$ being less than a reserved guaranteed bandwidth $GBR_t$, and the oversubscription is identified by the actual value $A_t$ being greater than the reserved guaranteed bandwidth $GBR_t$.

6. The method as recited in claim 1, wherein the generated network slice is a single network slice and is isolated from other network slices upon generation of the single network slice.

7. The method as recited in claim 3, wherein the updated prediction comprises selecting a highest magnitude of the network bandwidth detected during the monitoring as a baseline, adding a mean of a magnitude of the oversubscription to the baseline if an upward trend is detected during the monitoring, and subtracting a mean of a magnitude of the undersubscription to the baseline if a downward trend is detected during the monitoring.

8. A system for network bandwidth optimization comprising:
one or more processors operatively coupled to one or more computer-readable storage mediums, the processors being configured for:
transmitting sensor data from one or more sensors over a wireless network into a generated network slice;
submitting a Quality-of-Service (QoS) request for one or more applications by specifying desired network slice characteristics;
predicting network bandwidth needed for granting the QoS request for the one or more applications using a cost function based on magnitude, direction, and frequency of error;
continuously monitoring time-varying network bandwidth usage and periodically issuing new QoS requests for the one or more applications based on the monitoring;
generating an updated prediction for an updated bandwidth needed for the new QoS request using the cost function; and
iteratively adjusting network bandwidth reservations based on the updated prediction for the new QoS request to provide an amount of network resources to the one or more applications to support the new QoS request.

9. The system as recited in claim 8, wherein the wireless network is a 5G network.

10. The system as recited in claim 8, wherein the predicting the network bandwidth needed for granting the QoS request further comprises identifying any oversubscription or undersubscription of network resources to optimally balance application accuracy and network operational cost.

11. The system as recited in claim 8, wherein the cost function is represented as follows:

$$C_{total} = \sum_{t \in T} F_u \times (GBR_t - A_t) \otimes P_u + \sum_{t \in T} F_o \times (A_t - GBR_t) \otimes P_o,$$

where $C_{total}$ represents a total cost, t represents a time unit in a total duration T, $F_u$ represents a flag for undersubscription, $F_o$ represents a flag for oversubscription, $A_t$ represents actual value, $GBR_t$ represents reserved guaranteed bandwidth, $P_u$ represents a penalty cost for undersubscription, and $P_o$ represents a penalty cost for oversubscription.

12. The system as recited in claim 10, wherein the undersubscription is identified by an actual value $A_t$ being less than a reserved guaranteed bandwidth $GBR_t$, and the oversubscription is identified by the actual value $A_t$ being greater than the reserved guaranteed bandwidth $GBR_t$.

13. The system as recited in claim 8, wherein the generated network slice is a single network slice and is isolated from other network slices upon generation of the single network slice.

14. The system as recited in claim 10, wherein the updated prediction comprises selecting a highest magnitude of the network bandwidth detected during the monitoring as a baseline, adding a mean of a magnitude of the oversubscription to the baseline if an upward trend is detected during the monitoring, and subtracting a mean of a magnitude of the undersubscription to the baseline if a downward trend is detected during the monitoring.

15. A non-transitory computer readable storage medium comprising a computer readable program operatively coupled to a processor device for network bandwidth optimization, wherein the computer readable program when executed on a computer causes the computer to perform the steps of:
transmitting sensor data from one or more sensors over a wireless network into a generated network slice;
submitting a Quality-of-Service (QoS) request for one or more applications by specifying desired network slice characteristics;
predicting network bandwidth needed for granting the QoS request for the one or more applications using a cost function based on magnitude, direction, and frequency of error;
continuously monitoring time-varying network bandwidth usage and periodically issuing new QoS requests for the one or more applications based on the monitoring;
generating an updated prediction for an updated bandwidth needed for the new QoS request using the cost function; and
iteratively adjusting network bandwidth reservations based on the updated prediction for the new QoS request to provide an amount of network resources to the one or more applications to support the new QoS request.

16. The non-transitory computer readable storage medium as recited in claim 15, wherein the wireless network is a 5G network.

17. The non-transitory computer readable storage medium as recited in claim 15, wherein the predicting the network bandwidth needed for granting the QoS request further comprises identifying any oversubscription or undersubscription of network resources to optimally balance application accuracy and network operational cost.

18. The non-transitory computer readable storage medium as recited in claim 15, wherein the cost function is represented as follows:

$$C_{total} = \sum_{t \in T} F_u \times (GBR_t - A_t) \otimes P_u + \sum_{t \in T} F_o \times (A_t - GBR_t) \otimes P_o,$$

where $C_{total}$ represents a total cost, t represents a time unit in a total duration T, $F_u$ represents a flag for undersubscription, $F_o$ represents a flag for oversubscription, $A_t$ represents actual value, $GBR_r$ represents reserved guaranteed bandwidth, $P_u$ represents a penalty cost for undersubscription, and $P_o$ represents a penalty cost for oversubscription.

19. The non-transitory computer readable storage medium as recited in claim 17, wherein the undersubscription is identified by an actual value $A_t$ being less than a reserved guaranteed bandwidth $GBR_r$, and the oversubscription is identified by the actual value $A_t$ being greater than the reserved guaranteed bandwidth $GBR_r$.

20. The non-transitory computer readable storage medium as recited in claim 17, wherein the updated prediction comprises selecting a highest magnitude of the network bandwidth detected during the monitoring as a baseline, adding a mean of a magnitude of the oversubscription to the baseline if an upward trend is detected during the monitoring, and subtracting a mean of a magnitude of the undersubscription to the baseline if a downward trend is detected during the monitoring.

\* \* \* \* \*